United States Patent
Wilbur et al.

[11] 3,842,674
[45] Oct. 22, 1974

[54] REMOTE AIR TEMPERATURE INDICATOR

[75] Inventors: Robert L. Wilbur; Arthur C. Stickney, both of Portland, Maine

[73] Assignee: The Eastern Company, Naugatuck, Conn.

[22] Filed: May 1, 1972

[21] Appl. No.: 249,369

[52] U.S. Cl. ............................................. 73/362 AR
[51] Int. Cl. ............................................. G01k 7/24
[58] Field of Search .................. 73/362 AR; 333/79

[56] References Cited
UNITED STATES PATENTS

| | | | |
|---|---|---|---|
| 2,367,746 | 1/1945 | Williams | 333/79 X |
| 3,088,073 | 4/1963 | Newbold et al. | 73/359 X |
| 3,316,765 | 5/1967 | Trolander et al. | 73/362 AR |
| 3,348,415 | 10/1967 | Ash | 73/362 AR |
| 3,363,467 | 1/1968 | Weir | 73/362 AR |
| 3,611,791 | 10/1971 | Wilbur | 73/363.7 |
| 3,651,696 | 3/1972 | Rose | 73/362 AR |
| 3,688,581 | 9/1972 | Le Quernec | 73/362 AR |
| 3,721,001 | 3/1973 | Crosby et al. | 73/362 AR X |
| 3,738,174 | 6/1973 | Waldron | 73/362 AR |

Primary Examiner—Richard C. Queisser
Assistant Examiner—Frederick Shoon
Attorney, Agent, or Firm—Robert G. Slick

[57] ABSTRACT

A remote air temperature indicator is provided wherein a thermister is used as a temperature sensing element followed by a stable linear amplifier whereby a linear readout is provided on an analog-type meter. Preferably the thermistor is a composite thermistor network having a wide range of linearity from low to high temperatures.

1 Claim, 1 Drawing Figure

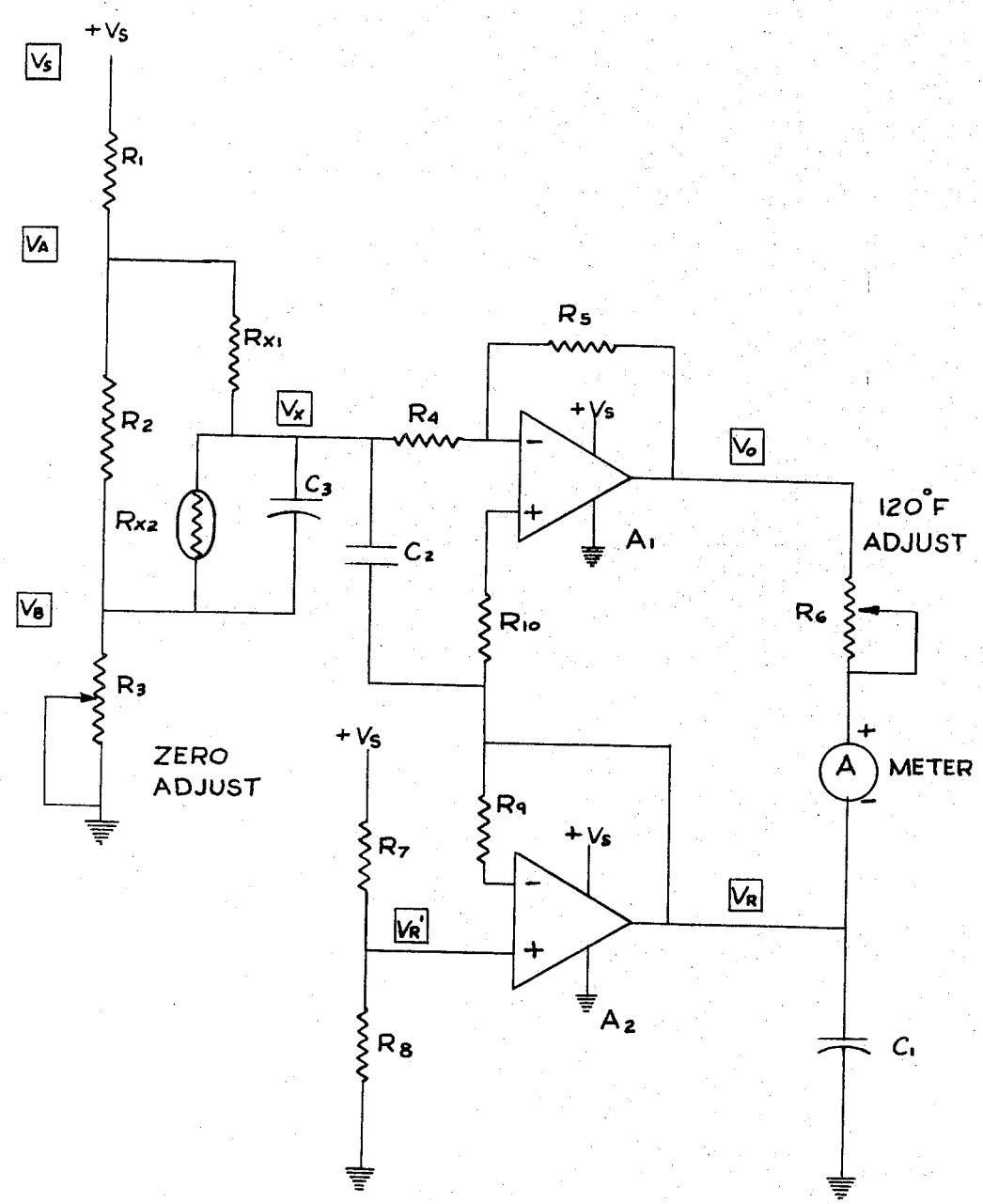

REMOTE AIR TEMPERATURE INDICATOR

SUMMARY OF THE INVENTION

It is frequently desirable to provide a temperature indicator at a remote point from a temperature sensor. Various devices have been suggested for doing this but they have not been fully satisfactory. One such device is set forth in the previous U.S. Pat. No. 3,611,791 of one of us wherein a housing is provided which might be mounted on a mast or the like and connected by means of wiring to a remote indicator. Although this is an extremely satisfactory device, the current drawn is higher than desirable and the linearity is not perfect.

In accordance with the present invention, a remote air temperature sensing system is provided wherein a thermistor is connected to an operational amplifier which can be employed to actuate a calibrated meter at a remote point. The current requirement is very small and, by employing the thermistor network, a substantially linear response can be obtained from $-40°F$ to $+120°F$.

BRIEF DESCRIPTION OF THE DRAWING

The sole FIGURE of the drawing is a schematic diagram of a temperature sensing device embodying the present invention.

DESCRIPTION OF THE PREFERRED EMBODIMENT

Referring now to the drawing by reference characters, an operational amplifier A2 is provided which serves as a non-inverting voltage follower. The non-inverting input of the amplifier is connected to a voltage divider made up of resistors R7 and R8 and the amplifier output to $V_R$ gives a very stable reference voltage which can be regarded as signal ground. Normally resistors R7 and R8 would be the same value, so that $V_R'$ is about half of Vs. A capacitor C1 provides AC ground path between signal ground and the actual ground and prevents switching transients or the like from interfering from the operation of the device. Obviously other power supplies could be used which give both positive and negative voltages with respect to a reference point.

The operational amplifier A1 is the main active element of the sensing system. This amplifier gives the high input impedance required to prevent loading of the sensor network, and it also provides the voltage swing and current needed to adequately drive the output meter. The amplifier is connected as an inverting amplifier with gain equal to R5 divided by R4, or typically five. The negative inverting input is connected through the input resistor R4 to the thermistor network output. The positive input is connected to the output of the reference voltage generator, and the amplifier output is connected through an adjustable series resistance R6 to the output meter, which in this case is an ammeter movement.

The input voltage $V_x$ to amplifier A1 is produced by the thermistor network R1, R2, R3, RX1, and RX2 in such a way that $V_x = V_R$ at $-40°F$ ($-40°C$). As the temperature increases, the input voltage becomes increasingly negative with respect to $V_R$. The network output voltage can be expressed as a linear function $V_x = A - BT$, where T is the temperature and A and B are constants. The temperature sensor RX2 is preferably a thermistor network manufactured by the Yellow Springs Instrument Co. and covered by U.S. Pat. No. 3,316,765. This sensor is supplied with a matched resistor Rx1. The voltage $V_X - V_B$ varies in respect to $V_A - V_B$ as a linear function of temperature. The value of $V_x$ will always be between $V_A$ and $V_B$. The voltage supplied to the sensor network, $V_A - V_B$, is kept at a low value to reduce thermistor self-heating and prevent sensor destruction. The power supply voltage is typically between 9 and 12 volts, while the voltage across the thermistor is kept below 3 volts. The value of R2 is selected so that R2<<RX1+Rx2, in order to keep the thermistor supply voltage nearly constant. The adjustment R3 is used to set $V_x$ to equal $V_R$ when the sensor is at $-40°F$ ($-40°C$). At this temperature $V_m$ will be zero.

The output voltage of the amplifier A1 is directly proportional to the the thermistor output voltage, and is inverted. At $-40°F$ the output of the amplifier is $V_R$ and the meter reads zero. The meter calibration resistor $R_6$ is adjusted so that the ammeter indicates 120°F (55°C) when the thermistor is at this temperature. The resistors $R_4$ and $R_5$ are selected so that $V_o$ is less than the amplifier saturation voltage at the maximum temperature.

The capacitor C2, along with C1, provides a ground path for any strong interference that might be picked up on the sensor lead wire. These capacitors allow the unit to function in the immediate vicinity of a high power ratio transmitter. A third capacitor C3 is to prevent radio interference from heating the thermistor and giving an incorrect temperature reading.

Normally the thermistor Rx2 would be mounted at some remote point, such as on the mast of a ship. It can be mounted in a housing such as that shown in U.S. Pat. No. 3,611,791.

We claim:

1. A remote temperature indicator comprising in combination:
   a. a temperature sensing network connected with a supply voltage and including a thermistor element mounted at a remote point on a ship or the like and a zero adjust means connected between said network and actual ground wherein said adjust means is adjusted to set the output voltage of said network to equal a reference signal ground voltage when said thermistor element is at $-40°F$ ($-40°C$),
   b. a first operational amplifier connected as an inverting amplifier wherein said output voltage of said network is connected to the negative inverting input and said reference voltage is connected to the positive non-inverting input of said amplifier whereby said output voltage is inverted and amplified,
   c. a meter connected to the output of said first operational amplifier whereby the meter reading is directly proportional to said output voltage of said network,
   d. a calibration means for said meter connected in series between said output of said first operational amplifier and said meter whereby said calibration means is adjusted to insure that said meter reads 120°F (55°C) when said thermistor is at said temperature,
   e. a reference voltage generator comprising a voltage divider connected between said supply voltage and said actual ground to produce a signal ground voltage therebetween, said voltage connected to the positive non-inverting input of a second operational amplifier operating as a non-inverting voltage follower whereby the output of said second amplifier is said reference signal ground voltage, f. a first capacitor connected between said output voltage of said network and said reference signal ground voltage, g. a second capacitor connected between said reference signal ground voltage and said actual ground, and h. a third capacitor connected to said output voltage of said network and in parallel with said thermistor element whereby, i. any strong electrical interference to said output voltage of said network and to said thermistor element will be effectively bypassed to said actual ground, permitting said indicator to function in the immediate vicinity of a high power radio transmitter.

* * * * *